Dec. 1, 1964   H. E. BROOKS, JR   3,158,939
EXTENSOMETER
Filed Aug. 30, 1963
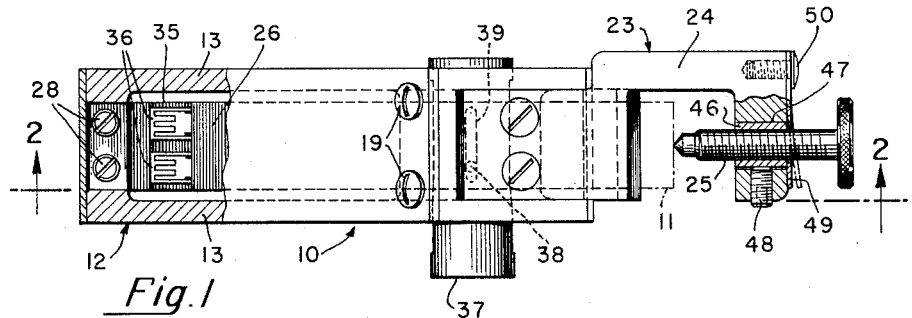
Fig. 1
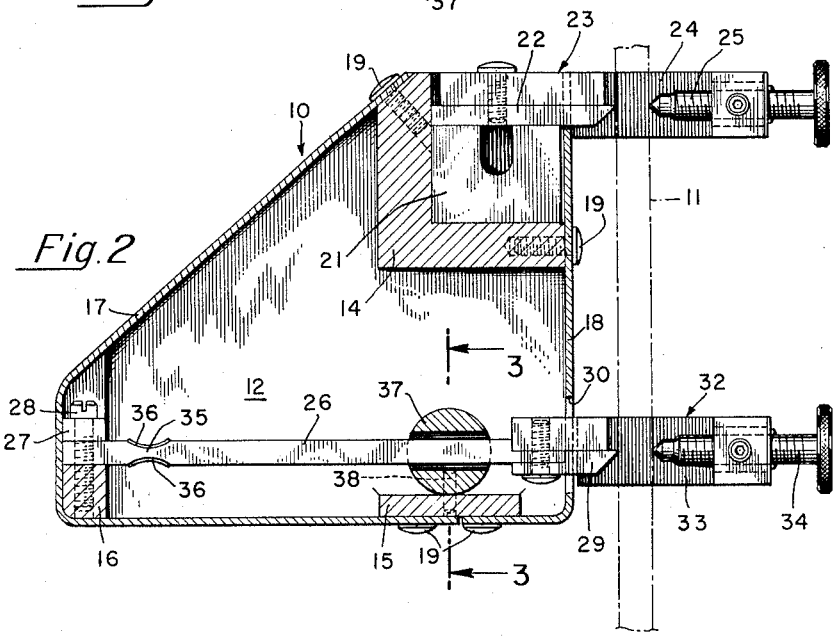
Fig. 2
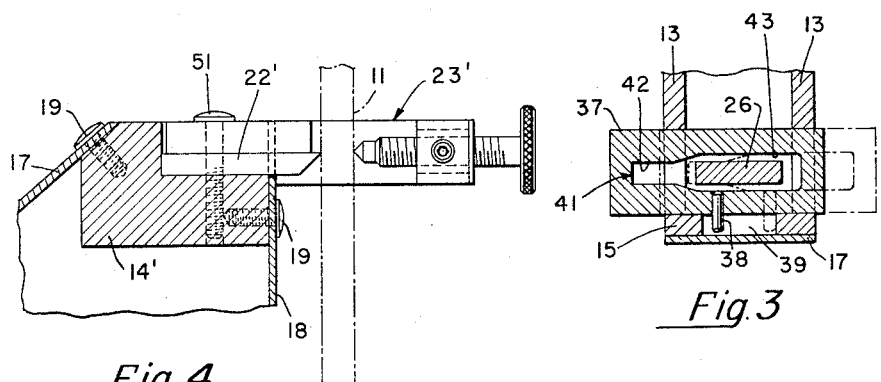
Fig. 4
Fig. 3
INVENTOR.
HARRY E. BROOKS, JR.
BY
ATTORNEY

United States Patent Office 3,158,939
Patented Dec. 1, 1964

3,158,939
EXTENSOMETER
Harry E. Brooks, Jr., Phoenixville, Pa., assignor to The Budd Company, Philadelphia, Pa., a corporation of Pennsylvania
Filed Aug. 30, 1963, Ser. No. 305,689
5 Claims. (Cl. 33—148)

This invention relates to an extensometer that can be attached to a test specimen for measuring small degrees of deformation in the test specimen when subjected to tensile or compressive loads.

One of the objects of the invention is to provide a novel extensometer for measuring both tensile and compressive strains.

Another object is to provide a strain gage extensometer that can be attached to a test specimen without greatly imbalancing the strain gages.

A further object is to provide an extensometer that will measure in both directions through zero.

Still another object is to provide a strain gage extensometer with means for preventing excessive strain from being applied to the strain gages.

Other objects and advantages of the invention will be apparent from the following description taken in connection with the accompanying drawing wherein:

FIG. 1 is a top plan view, partly in section and with portions removed, of an extensometer embodying the invention;

FIGS. 2 and 3 are sectional views taken along lines 2—2 and 3—3 of FIGS. 1 and 2 respectively; and FIG. 4 is a detail view of a modified form of the embodiment illustrated in FIGS. 1–3.

Referring now to the drawing, and first to FIGS. 1–3, there is shown an extensometer 10 adapted to be connected to a test specimen or piece 11 for measuring the deformation therein due to tensile or compressive loads applied longitudinally to the test piece. Extensometer 10 comprises a frame 12 having a pair of parallel walls 13 spaced apart and interconnected by an L-shaped support 14, a plate 15, and a post 16 arranged as best seen in FIG. 2. Walls 13 are flat and are five sided. A pair of cover plates 17 and 18 extend around the open edges of walls 13, as shown in FIG. 2, to define in conjunction with the frame a hollow housing.

Support 14 and the adjacent portion of walls 13 define an outwardly opening recess which receives a permanent magnet 21 that is permanently attached, as by a suitable adhesive, or press fit to frame 12. Attached to magnet 21 by magnetic force is a ferromagnetic clapper in the form of a knife edge member 22 one end of which abuts support 14 to position it for properly attaching the frame to the test piece. The other end of member 22 is a knife edge adapted to abut the test piece and prevent relative slippage therebetween when subjected to the test loads. Mounted on knife edge member 22 is a clamp 23 comprising a C-shaped clamp plate 24 having mounted thereon a manually operated screw 25 that is provided with a hardened point disposed opposite the knife edge so as to securely clamp the test piece therebetween upon tightening of the screw.

A cantilever beam 26 has its fixed end attached to post 16 by a clamp plate 27 and a pair of screws 28. Beam 26 extends from post 16 through the interior of the housing and is connected at its free end to a knife edge member 29 that projects through an opening 30 in cover 18. Mounted upon knife edge member 29 is a clamp 32 similar to clamp 23. Clamp 32 comprises a C-shaped clamp plate 33 and screw 34.

Beam 26 is of rectangular cross section and has, adjacent to its fixed end, a throat section 35 which weakens the beam at this point and thereby concentrates the stresses due to deflection of the free end of the beam. The knife edges are a fixed distance apart so that the measured deformation in the test specimen can be related to this distance. For most testing, the distance would be the standard two inches. The knife edge of knife edge 29 lies in the plane containing the neutral axis of beam 26 and the beam extends, when unstressed, perpendicular to the test specimen.

Bonded to throat section 35 are four electric resistance strain gages 36 located two on each side of the throat. The strain gages are adapted to be connected into a conventional strain measuring bridge by conductors not shown whereby deflection of the free end of beam 26 strains strain gages 36 to vary their resistance an amount proportional to the variation in strain imposed thereon. When beam 26 is unstressed, strain gages 36 are unstrained and therefore balanced.

A locking pin 37 slidably extends through aligned apertures in walls 13 of the frame. The locking pin extends along plate 15 and includes a stop pin 38 received in a groove 39 in plate 15. The purpose of the stop pin is to limit sliding movement of the locking pin. Locking pin 37 includes a longitudinal slot 41 through which beam 26 passes. Slot 41 includes a narrow section 42 having a thickness equal to that of the beam so that when the beam is in its locking position, illustrated by the dotted line in FIG. 3, the free end of the beam is prevented from moving. Slot 41 further includes a wide section 43 which, when the locking pin is in its inoperative position, allows the free end of the beam to be deflected over its intended range of travel. Section 43 limits movement of beam 26 to its intended range and any additional forces which tend to cause further movement are transmitted through the lock pin and into the frame causing separation between knife edge member 22 and magnet 21. Sections 42 and 43 are interconnected by a tapered portion which guides entrance of the beam 26 into the narrow section when the locking pin is moved to the locking position.

With reference to FIG. 1, the mounting of the screws upon each of the clamps is identical and, as shown in this figure, includes an internally threaded bushing 46 through which the screw passes. Bushing 46 is slidably received in a bore 47 and includes a flat edge which abuts a set screw 47 that prevents rotation of the bushing yet allows sliding movement thereof. The outer end of bore 47 is covered by a spring plate 49 attached to clamp plate 24 by a screw 50. Upon tightening of screw 25 against the test specimen, bushing 46 slides in bore 47 until it abuts the spring plate 49 which upon further tightening of the screw develops the necessary force for clamping the test specimen. The purpose of mounting the screw in such a manner is to maintain the screw in contact with the test specimen at a constant contact pressure as the specimen changes in thickness due to the applied test loads. When the testpiece is not clamped, the screw and bushing are free to slide in the bore 47 between the limits defined by the bushing and the head of the screw abutting the spring plate 49.

In operation, when it is desired to attach extensometer 10 to the test piece, screws 25 and 33 are loosened, if they are not already in such a condition, so as to permit the test piece to be inserted between the screws and knife edge. Locking pin 37 is moved to its locking position to thereby prevent any movement of the free end of beam 26. Then, the extensometer is placed next to the test piece and screws 25 and 33 are tightened to attach the extensometer. Each screw is tightened until its respective spring plate 49 moves away from the adjacent portions of the clamping plate a slight distance, such as illustrated by the dotted line in FIG. 1. In such positions, the screws are free to follow changes in the thickness of the test specimen in such a manner that the spring plates maintain a substantial constant contact pressure.

After the clamps have been attached, locking pin 37 is moved to its inoperative position whereupon application of the test load to test piece 11 causes the free end of beam 26 to deflect relative to the frame and thereby strain the strain gages 36 an amount proportional to the deformation in the test piece. When the deformation in the test piece induces a force between magnet 21 and knife edge member 22 that exceeds the magnetic force of attraction therebetween, the knife edge member 22 pivots away from one of the pole pieces of the magnet and thereby effectively detaches the frame from the test piece so that the restoring force in beam 26 allows the free end thereof to move to the unstressed position. As previously pointed out, the magnet is so chosen that its attractive force is such that the knife edge breaks away prior to the point at which the strain gages would be damaged due to excessive strain.

With reference to FIG. 4, there is shown a modified form of the extensometer wherein a knife edge number 22' and a clamp 23' are fixedly secured to support 14' by screw means 51. Support 14' is similar to support 14 except for the size of the outwardly opening recess which in the modified form is dimensioned to receive the ends of knife edge member 22' and clamp 23'. Under such circumstances, there will be no breaking away of the connection so that the extensometer fully follows all of the deformation in the test specimen.

Both embodiments are advantageous in that once the extensometer is attached to the test piece, the extensometer can measure deformation due to both tensile and compressive strains by passing through zero. "Zero" denotes the output of the bridge after the extensometer has been attached to an unstressed specimen and any bridge imbalance has been cancelled by adjusting the associated circuitry.

It will be apparent to those skilled in the art that many changes can be made in the details of construction and arrangement of parts without departing from the scope of the invention as defined in the appended claims.

What is claimed is:

1. An extensometer for measuring tensile and compressive deformations in a test piece, comprising: a rigid frame adapted to be placed adjacent to the test piece; first means connected to said frame and adapted to connect said frame to the test piece at a first gage point; a cantilever beam having one end fixed to said frame and a free end movable relative to said frame, said beam being adapted to extend substantially perpendicular to the test piece whereby said free end is located adjacent to the test piece; strain gage means bonded to said beam adjacent said one end thereof; and second means mounted on said free end and adapted to connect said free end to the test piece at a second gage point spaced a predetermined distance from the first gage point whereby tensile and compressive deformations of the test piece between said gage points moves said free end relative to said frame in opposite directions from an unstressed position.

2. An extensometer in accordance with claim 1 wherein said first means comprises a break-away connection adapted to disconnect said frame and test piece upon the application thereto of predetermined forces due to both tensile and compressive deformations of the test piece.

3. An extensometer in accordance with claim 1 and including a lock pin slidably mounted on said frame for movement between a locking position and an inoperative position, said lock pin and said beam being so constructed and arranged that said movable portion of said beam is prevented by said lock pin from moving when said lock pin is in said locking position and that said movable portion is free to move when said lock pin is in said inoperative position.

4. An extensometer in accordance with claim 1 wherein one of said first and second means includes a releasable magnetic connection adapted, upon the application thereto of a predetermined force, to disconnect in such a manner as to relieve the stress on said beam due to deformation predetermined tensile and compressive deformations of the test specimen.

5. An extensometer comprising: a rigid frame adapted to be placed adjacent a test specimen and including a support member spaced transversely from the test specimen; a cantilever beam having a fixed end mounted on said support member and extending transversely of the test specimen whereby the free end of said beam is adjacent said specimen, said beam having a portion of reduced dimension adapted to concentrate the stress therein due to deflection of said free end relative to said frame; strain gage means bonded to said portion and means for attaching said frame and said free end to said test specimen in such manner that deformation of said specimen deflects free end of said beam relative to said frame.

References Cited in the file of this patent

UNITED STATES PATENTS

| | | |
|---|---|---|
| 2,452,860 | Mostertz | Nov. 2, 1948 |
| 2,543,429 | Wood | Feb. 27, 1951 |
| 2,588,630 | Jackman | Mar. 11, 1952 |
| 2,611,966 | Rebman | Sept. 30, 1952 |
| 2,834,591 | Hess | May 13, 1958 |
| 2,869,854 | Ruefenacht | Jan. 20, 1959 |

FOREIGN PATENTS

| | | |
|---|---|---|
| 127,311 | Switzerland | Aug. 16, 1928 |
| 466,992 | Germany | Oct. 16, 1928 |